United States Patent
Hanson et al.

[11] 3,942,365
[45] Mar. 9, 1976

[54] POWER TEST MEANS AND METHOD FOR INTERNAL COMBUSTION ENGINES

[75] Inventors: Richard Eric Hanson, Winchester; Thomas Edward Nolan, Jr., Medfield, both of Mass.

[73] Assignee: RCA Corporation, New York, N.Y.

[22] Filed: Apr. 21, 1975

[21] Appl. No.: 569,857

[52] U.S. Cl. ............................................... 73/116
[51] Int. Cl.² ........................................ G01M 15/00
[58] Field of Search ............... 73/116, 133 R, 117.3; 58/146; 235/151.3

[56]         References Cited
         UNITED STATES PATENTS

| | | | |
|---|---|---|---|
| 3,331,200 | 7/1967 | Byron et al. | 73/116 UX |
| 3,657,922 | 4/1972 | Sibeud | 73/117.3 |
| 3,817,092 | 6/1974 | Ludloff | 73/133 R |

*Primary Examiner*—Jerry W. Myracle
*Attorney, Agent, or Firm*—Edward J. Norton; Carl V. Olson

[57]            ABSTRACT

Means for and method of testing the power of an internal combustion engine. A tachometer means coupled to the engine generates one electrical pulse per engine cycle of the engine. While the engine is full-throttle accelerated, a computer means measures the time periods between successive pulses, each time period constituting the reciprocal of the average engine speed during the particular engine cycle. One-half of the time period corresponding with a low speed and one-half of the time period corresponding with a high speed are added to the intermediate time periods to determine an acceleration time period which is a measure of engine power. The acceleration rate is determined by subtracting the reciprocal of the time period corresponding with the low speed from the reciprocal of the time period corresponding with the high speed to determine the speed change, and dividing the speed change by the acceleration time period. Brake torque is determined by multiplying the acceleration rate by the known inertia of the engine. The engine is then shut off and the deceleration rate is determined and is multiplied by the known inertia of the engine to determine the friction torque of the engine. The brake torque is added to the friction torque to determine the indicated (total) torque of the engine.

12 Claims, 7 Drawing Figures

POWER TEST MEANS AND METHOD FOR INTERNAL COMBUSTION ENGINES

The invention herein described was made in the course of or under a contract or subcontract thereunder with the Department of the Army.

BACKGROUND OF THE INVENTION

The full-load, full-speed testing of internal combustion engines for indicated power, brake power and friction power can be accomplished by connecting the engine to a motoring dynamometer capable of absorbing the full-load output of the engine and capable of driving the maximum frictional load of the engine while measuring speed and torque. Such dynamometers are very large, very expensive, and very inconvenient to use.

A much more economical and convenient apparatus for testing spark-ignition internal combustion engines under simulated full-load conditions is apparatus for operating the engine with all but one of $n$ ignitions interrupted, where $n$ may be greater than the number of cylinders, so that all cylinders are operated in sequence under full power conditions. The engine operates at full speed driving frictional and pumping loads, without danger of overspeeding and damaging the engine.

An economical and convenient brake power test of compression-ignition internal combustion engines under simulated full-load conditions is the acceleration burst test in which an engine initially operating at idle speed is suddenly given full throttle and caused to accelerate to a maximum governed speed. The inertia of the engine is the load on the engine, and the time taken to accelerate through a low speed to a high speed is a measure of the full-power output capability of the engine. This test is particularly useful for testing diesel engines, and provides a somewhat less accurate indication of the condition of a spark-ignition engine equipped with a carburetor instead of fuel injectors.

The accuracy with which the full output power capability of the engine is given by the time taken to accelerate from a low speed to a high speed depends on the accuracy of the speed measurements, which are in units of angular displacement (such as revolutions) divided by units of time (such as minutes or seconds). An accurate measurement of speed is complicated by the fact that the burst acceleration from a low speed to a high speed takes only about one second or less. Another complication has been found to be due to pulsations in instantaneous speed which are due to explosions and compressions in individual cylinders of the engine. The pulsations in instantaneous speed are particularly disturbing if they are non-uniform due to malfunctioning of one or more individual cylinders of the engine.

An additional problem associated with this type of test is that of interpreting the results. A low output power indication may be caused by relatively high power absorption of the engine and its accessories. Large variations in frictional load can be expected from test to test on different vehicles in different conditions with different accessory loads since the frictional load on an engine is dependent on oil type and temperature, accessory load, and other effects. Thus, a very significant engine power test parameter is the indicated (total) power developed within the engine. Knowing this and the brake (output) power capability of an engine allows for differentiation between internal and external engine problems, and sometimes differentiation between real and apparent engine problems.

SUMMARY OF THE INVENTION

In a test of the power of an engine, tachometer means generates one electrical pulse per engine cycle of the engine (one pulse per revolution of a two stroke engine, or one pulse per two revolutions of a four-stroke engine). An engine-cycle time period between successive electrical pulses is the reciprocal of the average speed during the engine cycle. Instantaneous speed fluctuations, which occur due to power and compression strokes in individual cylinders, follow the same pattern during all engine cycle time periods. The electrical pulses, which always occur at the same relative time in each engine cycle, are used to accurately measure the time taken to accelerate from a low engine speed to a high engine speed without errors due to instantaneous speed fluctuations. One half of the time period between successive pulses in a predetermined low engine speed range and one half of the time period between successive pulses in a predetermined high engine speed range are added to the intermediate time periods to provide an accurate time measure of the full-power condition of the engine.

The average acceleration rate is determined by subtracting the reciprocal of the time period corresponding with the low speed from the reciprocal of the time period corresponding with the high speed to determine the speed change, and dividing the speed change by the acceleration time period. Brake torque is determined by multiplying the acceleration rate by the known inertia of the engine. The engine is then shut off and the deceleration rate is similarly determined and is multiplied by the known inertia of the engine to determine the friction torque of the engine. The brake torque is added to the friction torque to determine the indicated (total) torque of the engine.

DESCRIPTION OF THE PREFERRED EMBODIMENT

Figures 1, 2:
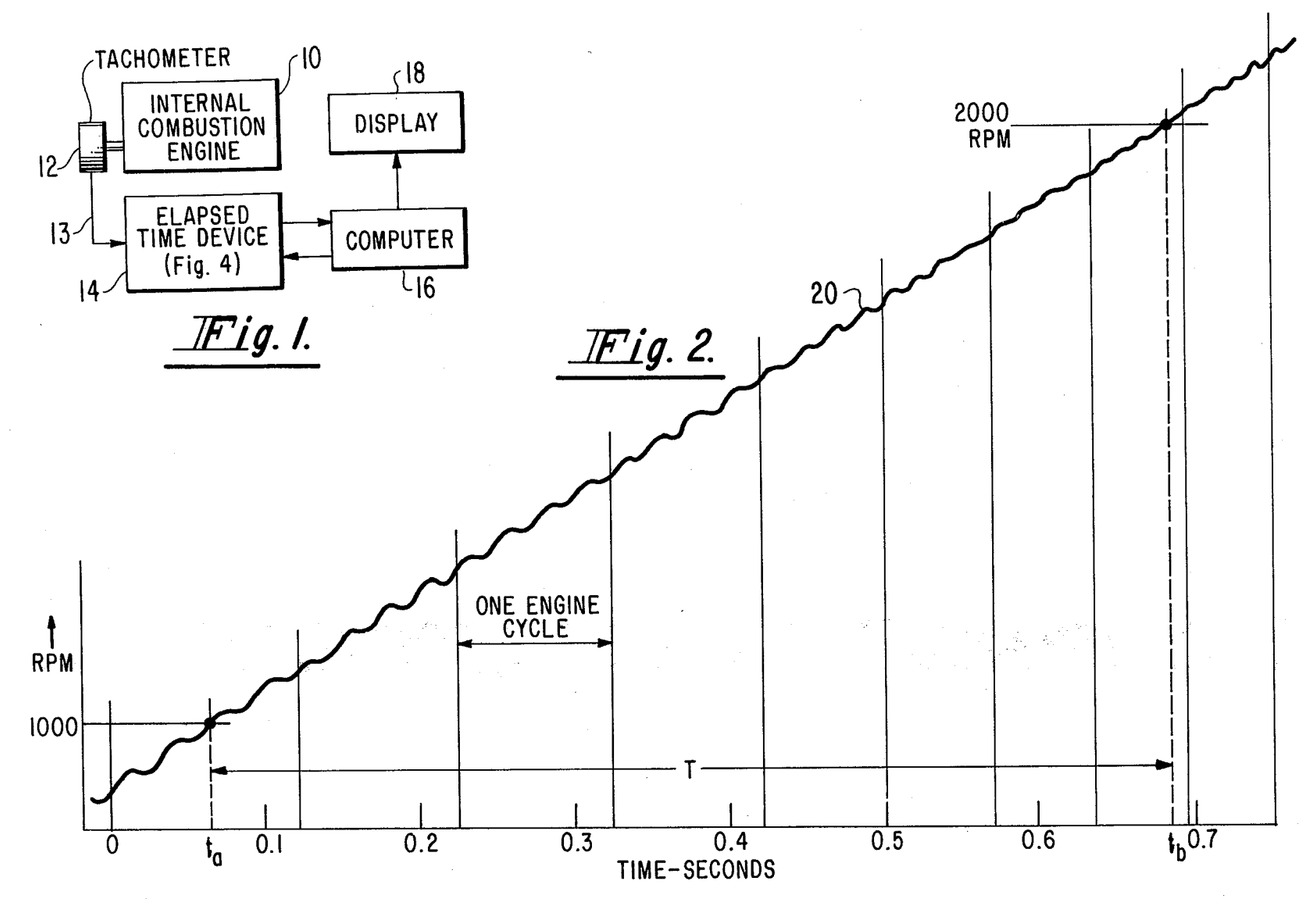
FIG. 1 is a block diagram of apparatus used for an acceleration burst test of the full-power condition of an internal combustion engine.
FIG. 2 is a chart of engine speed vs. time showing instantaneous speed fluctuations during acceleration of a four-cylinder engine.

Referring now in greater detail to the drawing, FIG. 1 shows an internal combustion engine 10, such as a diesel engine, equipped with a pulse tachometer 12, from which electrical pulses are applied over line 13 to an elapsed time device 14. The elasped time device (shown in detail in FIG. 5) operates under the control of a computer 16 to measure time intervals. The computer 16 computes the test results for display by a display device 18.

The pulse tachometer 12 may be simply a housing with a shaft driven by the engine, and a tooth or teeth on the shaft which passes or pass a magnetic pick-up to produce one electrical pulse in the winding or coil of the pick-up for each tooth on the shaft. The pulse tachometer 12 produces one or more electrical pulses per revolution of the engine crankshaft, and these pulses are applied to an elapsed time device 14 which, if necessary reduces the number of pulses to one pulse per engine cycle.

The acceleration burst test to be described utilizes one electrical pulse per engine cycle. One engine cycle is defined as the time taken for the engine to accomplish intake, compression, power and exhaust in one cylinder. One engine cycle occurs in one crankshaft revolution of a two stroke engine because all four functions are accomplished in two strokes of the piston. On the other hand; one engine cycle occurs during two crankshaft revolutions of a fourstroke engine because the four functions are accomplished in four strokes of the piston.

FIG. 2 is a speed-time chart showing the acceleration characteristic 20 of an engine from 1000 rpm to 2000 rpm in a time period T. The solid vertical lines of the chart represent the boundaries of individual engine cycles and the times of electrical pulses from the tachometer 12. The line 20 in the chart shows speed fluctuations recuring similarly in each engine cycle. The engine represented is a four-cylinder engine having four power pulses per engine cycle causing four instantaneous speed peaks. It can be seen that the instantaneous speed fluctuations may result in a short-term reduction in speed while the average speed is increasing. These speed fluctuations introduce inaccuracies into any ordinary method of measuring the time T required to accelerate from a speed of 1000 rpm to a speed of 2000 rpm. The inaccuracies are even greater when the engine has one or two faulty cylinders which cause even greater irregularities in instantaneous speed during acceleration.

The accuracy with which the average acceleration time T can be measured is improved by deriving all time and speed measurements from tachometer pulses occurring once per engine cycle. All pulses occur at the same relative part of the respective engine cycles. Therefore, the time interval from a pulse at a low engine speed to a pulse at a high engine speed is unaffected by instantaneous speed changes during engine cycles. The average engine acceleration is assummed to be linear during an engine cycle.

Figure 3:
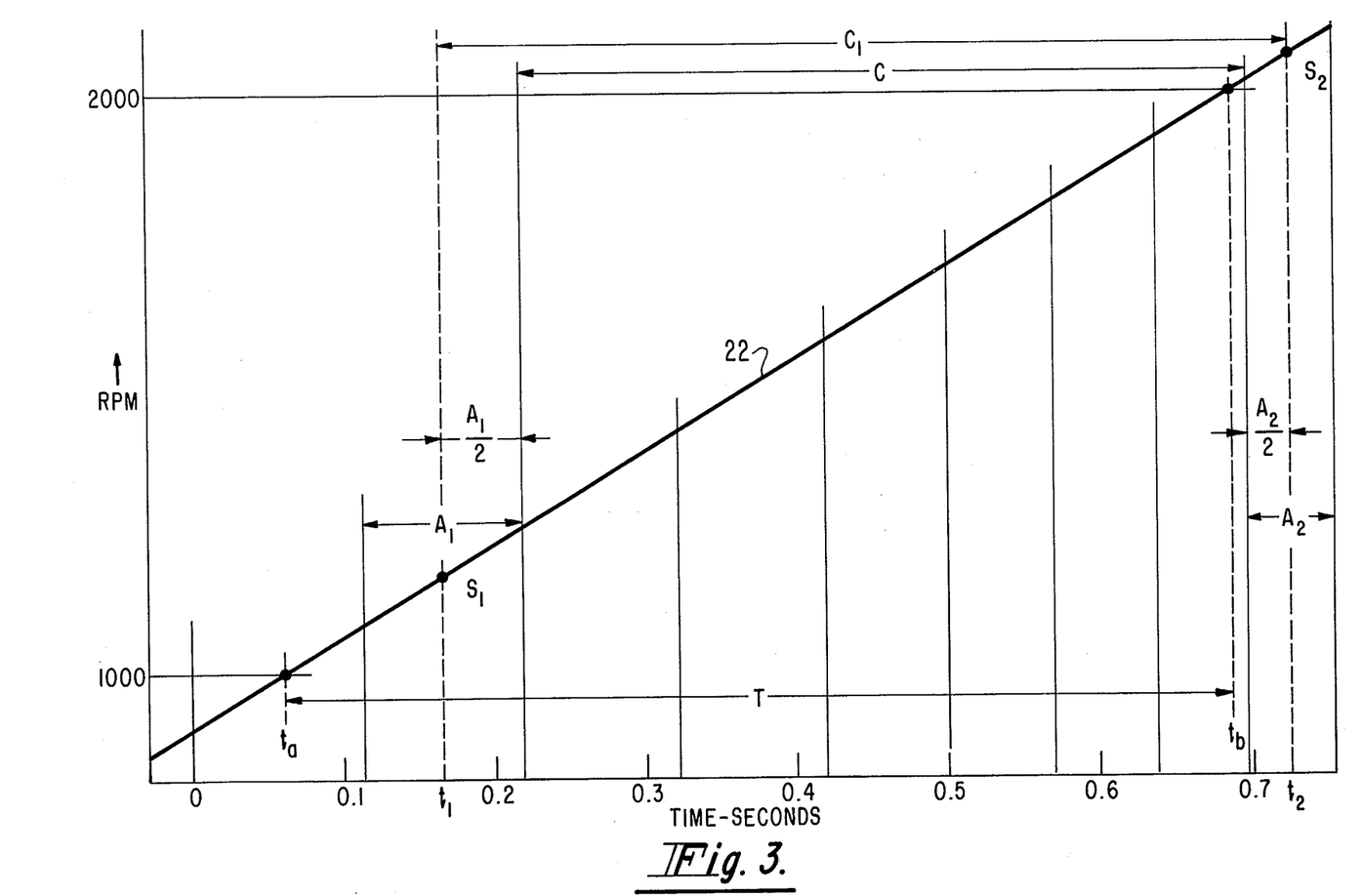
FIG. 3 is a chart of engine speed vs. time during acceleration which will be referred to in describing the operation of the invention.

FIG. 3 is a speed-time chart similar to FIG. 2 but with the speed characteristic 22 smoothed to average out the instantaneous speed fluctuations. The acceleration time T from 1000 rpm at time $t_a$ to 2000 rpm at time $t_b$ is not measured, but rather the acceleration time $C_1$ is measured. Time $C_1$ equals onehalf of the first engine cycle time period $A_1$ corresponding with an average speed greater than 1000 rpm, plus one-half of the first engine cycle time period $A_2$ with an average speed greater than 2000 rpm, plus the intermediate time periods C. The average speed $S_1$ during engine cycle $A_1$ is the reciprocal of the time period $A_1$ and is greater than 1000 rpm. Similarly, the average speed $S_2$ during engine cycle $A_2$ is greater than the high speed of 2000 rpm.

Figure 4:
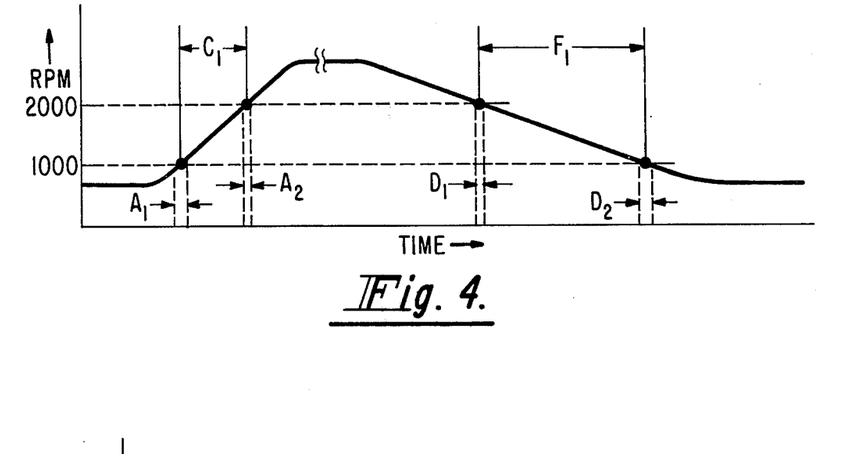
FIG. 4 is a chart of engine speed vs. time during a test including a deceleration portion following the acceleration portion.

FIG. 4 is a speed-time chart similar to FIG. 3, but illustrating both the acceleration and deceleration portions of the test. In addition to the parameters shown in FIG. 3. FIG. 4 also shows the measured deceleration time $F_1$, which equals one-half of the first engine cycle time period $D_1$ corresponding with an average speed less than 2000 rpm (after acceleration), plus one-half of the first engine cycle time period $D_2$ with an average speed less than 1000 rpm, plus the intermediate time periods.

Figure 5:
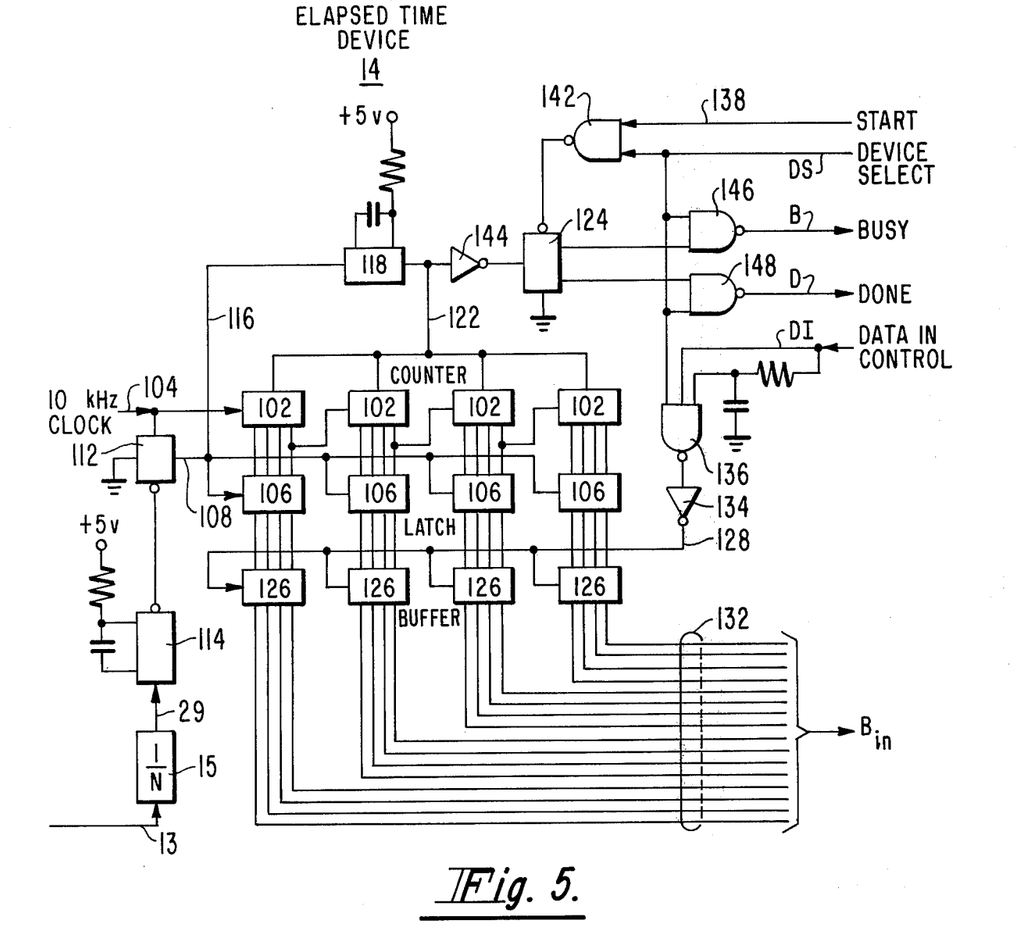
FIG. 5 is a logic diagram of the elapsed time device included in the system of FIG. 1.

FIG. 5 is a circuit diagram of the elapsed time device 14 of FIG. 1. Device 14 receives electrical pulses from tachometer 12 over line 13 and applies them through a divide-by-N-counter 15 to a one-shot multivibrator 114. The divider 15 is provided if the tachometer used produces more than one pulse per engine cycle. The output 29 from the divider 15 is one pulse per engine cycle.

The elapsed time device 14 includes a 16-bit counter each consisting of four 4-bit integrated circuits 102. The counter counts the pulses applied over clock line 104 from a clock (not shown). The 16 outputs from the counter are coupled to 16 stages of a corresponding count latch consisting of integrated circuits 106. The count latch 106 receives and holds the count in the counter 102 when enabled by a transfer signal on line 108 from the transfer latch 112. Transfer latch 112 receives relatively infrequent pulses having a duration greater than the 0.1 msec duration of one cycle of the 10 kHz clock from a one-shot multivibrator 114, which responds to input pulses on line 29 from the divide-by-N counter 24.

The elapsed time unit 14 also includes a 16-bit buffer 126 consisting of four integrated circuits, which can be enabled over line 128 to transfer the 16-bit count in the count latch 106 to the computer 16 via the 16-conductor data bus 132. The buffer 126 is enabled by signals through inverter 134 from nand gate 136. Gate 136 provides an output when it receives both a device select signal over line DS from the computer and an appropriate "data in" control signal over line DI from the computer. In this way the computer can sample the data stored in the counter latches under program control as required. From the counter latches, the computer periodically receives the count which represents the time period between two pulses representative of the engine speed.

In normal operation the elapsed time device 14 is initialized by the computer 16 by a "start" signal applied over line 138 to nand gate 142, simultaneously with a device select signal over line DS. The output of gate 142 causes the third latch 124 to assume a "busy" state. The latch 124 remains in the busy state until set to the "done" state by a signal through inverter 144 from the one-shot 118 when the count in counter 102 is transferred to the count latch 106. The busy or done status of the counter of the timing unit is available to the computer 41 through lines B and D whenever the gates 146 and 148 are enabled by a "device select" signal on line DS from the computer.

In summary, the elapsed time device 14 continually measures and latches the time periods between successive pulses occurring once per engine cycle, and sets its own state to "done" each time an engine cycle time period is stored. The computer can then cause a transfer of the store count in the latch through the buffer to the computer. The computer sets the timing device to the "busy" state whenever continued measuring of time periods is needed.

The elapsed time device 14 is not needed if the computer 16 employed includes a real time clock, and the program for the computer causes the computer to perform the time period measuring and storing function performed by the device 14.

The computer 16 may, by way of example only, be a "Nova 1200" minicomputer manufactured and sold by Data General Corporation, Southboro, Massachusetts 01772. The Nova 1200 is a low cost minicomputer designed for general purpose applications. It has a 16-bit word, multi-accumulator central processor, and a full memory cycle time of 1200 nanoseconds. It executes arithmetic and logical instructions in 1350 nanoseconds. The entire Nova 1200 central processor fits on a single 15-inch-square printed circuit subassembly board. The basic computer includes four thousand 16-bit words of core memory, a Teletype interface, programmed data transfer, automatic interrupt source identification, and a direct memory access channel. User programming conveniently can be in the BASIC language.

The display device 18 (FIG. 1) for use with the Nova 1200 computer may be a conventional Teletypewriter, a printer, a 4-digit display such as one including Numitron character display tubes, or any other similar display device.

OPERATION

The operation of the system of FIG. 1 will now be briefly described with references to the chart of FIGS. 3 and 4, and later will be described in greater detail with references to the flow chart of FIG. 6.

In the initial condition, the engine 10 is operated at an idle speed of about 700 rpm, the tachometer 12 supplies pulses to the elapsed time device 14 which is continuously counting the time periods between engine cycle pulses after receiving a "start" signal from the computer 16, and the display 18 is displaying a "full throttle" message received from the computer 16.

The human test operator applies full throttle to the engine causing it to accelerate to a governed high limit speed.

The computer continuously receives the count from the counter in device 14 for the time between engine cycle pulses until a count for an engine cycle $A_1$ is reached corresponding to an average speed greater than the predetermined low speed of 1000 rpm. The preceding engine cycle corresponds to an average speed less than the predetermined low speed of 1000 rpm. The computer then computes the time period $A_1/2$ (FIG. 3) and starts adding the counts of the following engine cycle time periods.

The computer continuously receives the count from the counter in device 14 for the time between engine cycle pulses until a count for an engine cycle $A_2$ is reached corresponding to a speed greater than the predetermined high speed of 2000 rpm. The preceding engine cycle corresponds to a speed less than the predetermined high speed of 2000 rpm. The computer then stops adding counts and computes the time period $A_2/2$.

The computer then adds the measured time period $A_1/2$ and the time period $A_2/2$ to the counted time C to arrive at the time period $C_1$. The time period $C_1$ represents the time required by the engine to full-throttle accelerate from a low speed $S_1$ to a high speed $S_2$.

The computer then uses time periods A1, A2, and C1 to calculate the engine acceleration rate B; where:

$$B = \frac{\left(\frac{1}{A2} - \frac{1}{A1}\right)(4 \times 10^8)\pi}{C1}.$$

Following this calculation the result is displayed to the operator as an indication that the acceleration portion of the test is complete and that he should shut off the engine. Then the engine will decelerate, and the test system will measure or calculate D1, D2, and F1 in a manner similar to the acceleration portion of the test. FIG. 4 illustrates this portion of the test, as well as the acceleration portion of the test. From D1, D2, and F1 the computer will calculate the deceleration rate E, where:

$$E = \frac{\left(\frac{1}{D1} - \frac{1}{D2}\right)(4 \times 10^8)\pi}{F1}.$$

Figure 7:
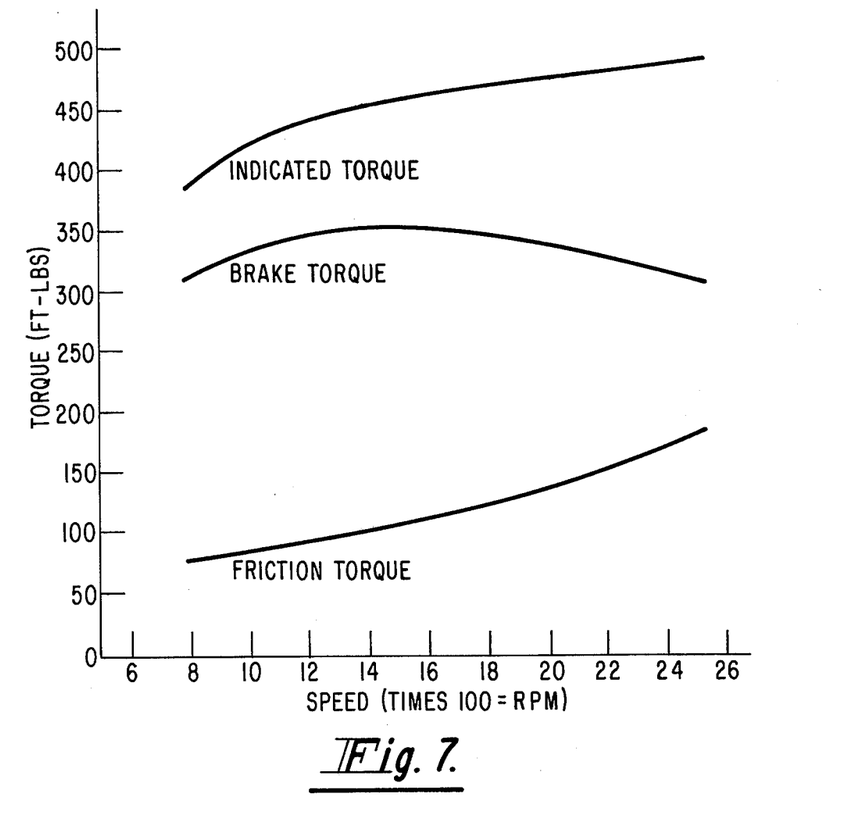
FIG. 7 is a chart showing torque vs. speed curves for a typical compression-ignition engine.

The computer will then calculate and display the values of indicated, brake and friction, torques (and horsepowers, if desired) for the 1000–2000 rpm speed range of the engine from the acceleration rate B and deceleration rate E. From these values, the operator can easily evaluate the power development capability of the engine as well as its frictional load in comparison with known characteristics, such as are shown in FIG. 7, of a good engine.

Figure 6:
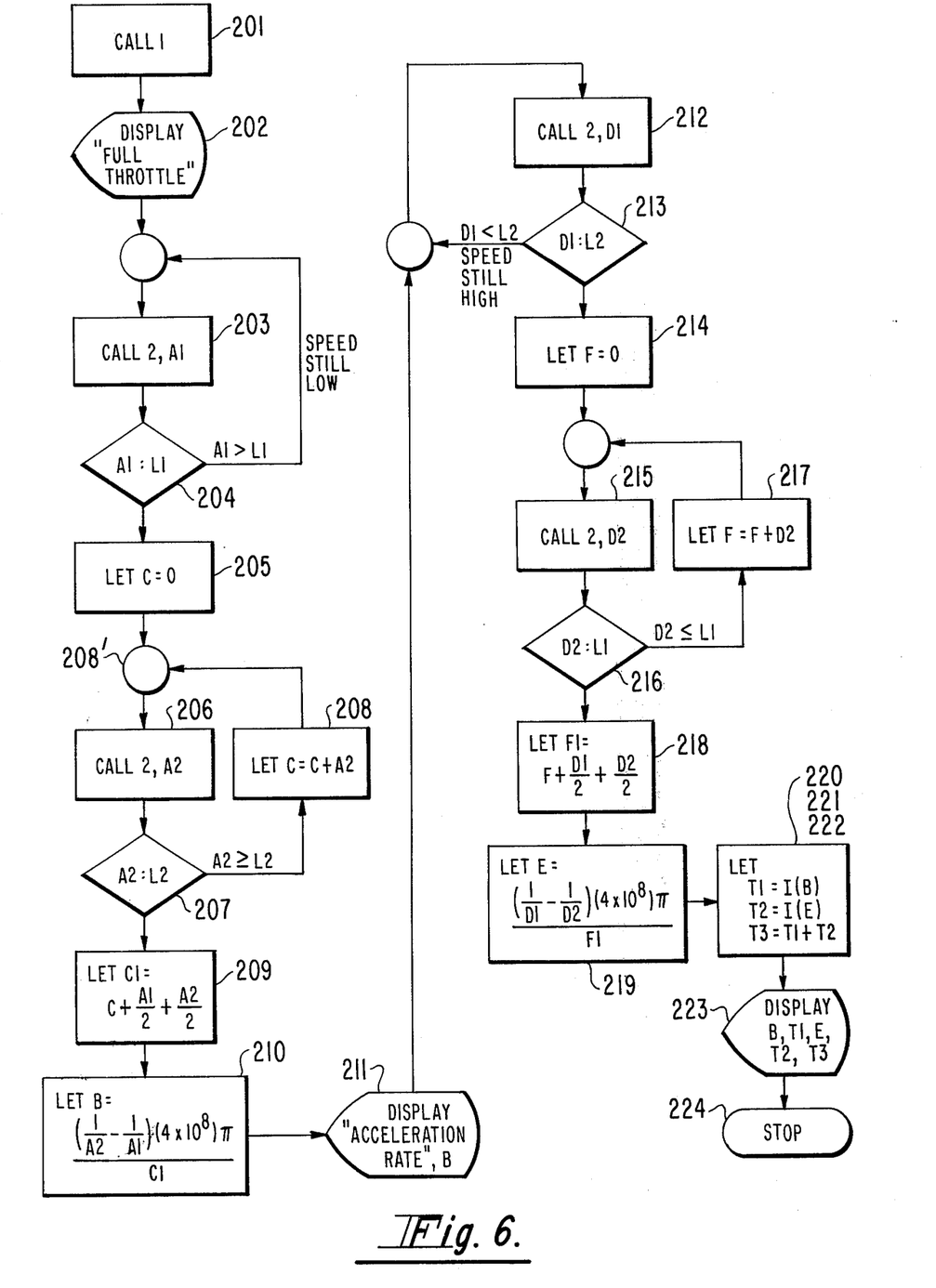
FIG. 6 is a flow chart of a program used in the computer in the system of FIG. 1 to control the test procedure and compute the test result.

Reference is now made to the program flow chart of FIG. 6 for a description of the operation of the system of FIG. 1.

| Statement Number | Program Step and Description |
|---|---|
| 201 | CALL 1. When the computer executes this instruction, the engine should be running at idle. The instruction causes the computer to send a START pulse to the elapsed time device 14. This sets the device to the Busy State which initializes the system preparing it for time period (speed) measurements. |
| 202 | DISPLAY "FULL THROTTLE". This instruction outputs the message "FULL THROTTLE" to the display 18 indicating to the operator that the system is ready. At this point the vehicle should still be operating at idle speed. |
| 203 | CALL 2, A1. This instruction causes the system to wait for the next engine period pulse and then the computer inputs the time period between the last two pulses. This input value is saved as parameter A1. For a four cycle engine such as the LD465 with one pulse per engine cycle (2 revolutions) the A1 input at idle will be about 170.0 msec or A1 = 1700 (this corresponds to about 706 RPM). |
| 204 | If A1 > L1 THEN GO TO 203. This instruction is testing the vehicle speed looking for the beginning of the acceleration. If the acceleration rate in the 1000 to 2000 RPM range is desired from one pulse per engine cycle L1 would be 120 msec or 1200 (for 4 cycle engine) since the system measures time in 0.1 msec units. On execution of this instruction, the computer will compare the most recent input value of A1 with L1 and if it is greater than L1 the |

| Statement Number | - Program Step and Description |
|---|---|
| | computer jumps back to instruction 203 again. Otherwise it will continue on to the next sequential instruction 205. |
| 205 | LET C = 0. At this point in the program the acceleration in the range of interest has just begun. The parameter C is going to be used to accumulate the total time period between start and stop of the acceleration portion of the test. Thus, C must be initialized to zero which is all this instruction does. |
| 206 | CALL 2, A2. Like instruction 203 this instruction causes the system to wait for the next pulse and then inputs a new time period measurement. This time the measurement is saved as A2. |
| 207 | IF A2 < L2 THEN GO TO 209. This instruction is trying to detect a speed in excess of the upper speed limit. If the measured time period A2 is less than the limit L2 (for four cycle engines with one pulse per engine cycle an L2 corresponding to 2000 RPM would be 60 msec or L2 = 600 in system time units, 0.1 msec), then the program jumps to statement 209 to proceed with acceleration rate calculations. If A2 is greater than or equal to L2 the computer executes the next sequential Instruction 208. |
| 208 | LET C = C + A2. When the last measured value of A2 is still within the speed range of interest the computer will take this branch of the program. This instruction thus, acts as a time accumulator summing all the A2 measurements occurring within the acceptable speed range and saving the sum as parameter C. Each execution of this statement simply adds the last measured value of A2 to the previously accumulated value of C. |
| 208' | GO TO 206. This instruction simply causes the computer to branch back to step 206 forming a program loop. |
| 209 | LET C1 = C + A1/2 + A2/2. Execution of this statement performs the following function: $$C1 = C + \frac{A1}{2} + \frac{A2}{2}$$ This value is used by the next instruction for the acceleration rate calculation which needs the total time period between the first time period (A1) and the last time period (A2). Since the speed cross points used within the acceleration rate calculation (step 210) are derived from the inverse of the time period, they are actually an average speed measurement for the given time period. However, by assuming a linear speed versus time characteristic within the time period, the time of an instantaneous speed corresponding to the measured average value can easily be interpolated by division by 2. Thus, this program statement corrects the accumulated total time period by adding to it one half of the first and last time periods (A1 and A2). |
| 210 | LET B = (1/A2 - 1/A1)*4*10↑8*3.14159/C1. Execution of this instruction performs the calculation: $$B = \frac{\left(\frac{1}{A2} - \frac{1}{A1}\right)(4 \times 10^8)\pi}{C1}$$ where B is the acceleration rate in rad/sec² (which is directly proprotional to engine output torque). The 1/A2 factor is the average speed of the final time period measurement and 1/A1 is the average speed of the initial time period measurement. $(4 \times 10^8)\pi$ is simply a units conversion factor. For the test example shown in FIG. 4: $$B = \frac{\left(\frac{1}{581} - \frac{1}{1013}\right)(4 \times 10^8)\pi}{5506} = 167.52 \text{ rad/sec}^2$$ |
| 211 | DISPLAY "ACCELERATION RATE", B. This instruction simply outputs the message "ACCELERATION RATE" and the calculated value of B to the display 18. This informs the |

| Statement Number | - Program Step and Description |
|---|---|
| | operator that the acceleration portion of the test is complete. At this time, or soon after, he should shut off the engine so that the system can run the deceleration portion of the test.<br>NOTE: Statements 212 through 219 perform the same function during the engine deceleration as statements 203 through 210 on acceleration except for the comparisons of 213 and 216. These are naturally inverted since the speed versus time characteristic has the sign of the slope changed. Execution of all of these steps results in the calculation of the deceleration rate, E. For an LD465 engine (such as for the acceleration test example given) a normal deceleration rate would be about E = 73 rad/sec². |
| 220 | LET brake torque T1 = I*B. |
| 221 | LET friction torque T2 = I*B. Execution of these statements multiplies B by I, and E by I, respectively, where I is the inertia of the test engine (I = 1.427 ft. lb. sec² for LD465 engine). T1 is the average brake torque (or output torque available) and T2 is the average friction torque of the test engine in the test speed range. |
| 222 | LET T3 = T1 + T2. This instruction sums T1 and T2 (brake and friction torque) to give T3 which is the indicated torque or total torque developed within the engine. |
| 223 | DISPLAY B, T1, E, T2, T3. This instruction simply outputs the key resultant test parameters to the operator. The values displayed are:<br>B = Acceleration rate in rad/sec²<br>T1 = Brake torque in ft. lbs.<br>E = Deceleration rate in rad/sec²<br>T2 = Friction torque in ft. lbs.<br>T3 = Indicated torque in ft. lbs.<br>Thus, in one simple acceleration/deceleration test the operator gets key test parameters that in the past took considerable time and bulky expensive equipment. |

What is claimed is:

1. Means for testing the power of an internal combustion engine during a full-throttle acceleration of the engine, comprising
    tachometer means coupled to said engine to generate one electrical pulse per engine cycle of the engine,
    a display device, and
    a computer means receptive to the output of said tachometer and providing an output to said display device, said computer means being programmed to measure the time periods between successive pulses, each time period constituting the reciprocal of the engine speed during the particular engine cycle, and being programmed to add one-half of the time period corresponding with a low speed and one-half of the time period corresponding with a high speed to the intermediate time periods to compute an acceleration time period which is a measure of engine power.

2. The combination as defined in claim 1, wherein said computer means is programmed to determine said time period corresponding with a low speed to be the first time period following achievement of a specific predetermined low speed, and to determine said time period corresponding with a high speed to be the first time period following achievement of a specific predetermined high speed.

3. The combination as defined in claim 1 wherein said computer means is also programmed to determine the acceleration rate by subtracting the reciprocal of the time period corresponding with the low speed from the reciprocal of the time period corresponding with the high speed to determine the speed change, and dividing the speed change by said acceleration time period, and to display the resulting acceleration rate on said display device.

4. The combination as defined in claim 3 wherein said computer means is also programmed to multiply the said acceleration rate by the known inertia of the engine to compute the brake torque of the engine, and to display the brake torque on said display device.

5. The combination as defined in claim 4 wherein said computer means is also programmed to similarly compute the deceleration rate during a deceleration of the engine, and to multiply said deceleration rate by the known inertia of the engine to compute the friction torque of the engine.

6. The combination as defined in claim 5 wherein said computer means is also programmed to add said brake torque to said friction torque to compute the indicated torque of the engine.

7. The method of testing the power of an internal combustion engine having a tachometer producing one electrical pulse per engine cycle of the engine, comprising the steps of
    full-throttle accelerating the engine from an idle speed to a high governed speed,
    measuring the time periods between successive pulses, each time period constituting the reciprocal of the engine speed during the particular engine cycle,
    comparing the measured time periods with time periods corresponding with a predetermined low speed and a predetermined high speed,
    selecting a low speed and a high speed time period, and
    adding one-half of the selected low speed time period and one-half of the selected high speed time period to the intermediate time periods to determine the acceleration time period which is a measure of engine power.

8. The method as defined in claim 7 wherein said selected low speed and high speed time periods are the first measured time periods following achievement of the specific predetermined low and high speeds, respectively.

9. The method as defined in claim 7, and, in addition, the steps of determining the acceleration rate by subtracting the reciprocal of the selected time period corresponding with the low speed from the reciprocal of the selected time period corresponding with the high speed to determine the speed change, and dividing the speed change by said acceleration time period.

10. The method as defined in claim 9, and, in addition, the step of multiplying the said acceleration rate by the known inertia of the engine to compute the brake torque of the engine.

11. The method as defined in claim 10, and, in addition, the steps of decelerating the engine and similarly computing the deceleration rate of the engine, and multiplying the said deceleration rate by the known inertia of the engine to compute the friction torque of the engine.

12. The method as defined in claim 11, and, in addition the step of adding said brake torque to said friction torque to compute the indicated torque of the engine.

* * * * *